US006437704B1

(12) United States Patent
Nödinger

(10) Patent No.: US 6,437,704 B1
(45) Date of Patent: Aug. 20, 2002

(54) OUTFLOW ELEMENT FOR VEHICLES, IN PARTICULAR, MOTOR VEHICLES

(75) Inventor: Matthias Nödinger, Neuhausen (DE)

(73) Assignee: Reitter & Schefenacker GmbH & Co. KG, Esslingen (DE)

( * ) Notice: Subject to any disclaimer, the term of this patent is extended or adjusted under 35 U.S.C. 154(b) by 0 days.

(21) Appl. No.: 09/668,645

(22) Filed: Sep. 22, 2000

(30) Foreign Application Priority Data

Sep. 23, 1999 (DE) ..................................... 299 16 755 U

(51) Int. Cl.[7] ................................................ G08B 5/00
(52) U.S. Cl. ........................ 340/815.4; 454/69; 454/126
(58) Field of Search ......................... 340/815.4, 815.42, 340/815.43, 815.45; 454/69, 75, 126; 62/186

(56) References Cited

U.S. PATENT DOCUMENTS

| | | | | |
|---|---|---|---|---|
| 4,875,624 A | * | 10/1989 | Hara et al. .................. | 236/49.5 |
| 5,056,421 A | * | 10/1991 | Iida .............................. | 454/75 |
| 5,127,877 A | * | 7/1992 | Muller ........................ | 454/126 |
| 5,765,635 A | * | 6/1998 | Rhee .......................... | 165/203 |
| 6,012,297 A | * | 1/2000 | Ichishi et al. ................ | 62/179 |
| 6,163,098 A | * | 12/2000 | Taylor et al. ................ | 310/308 |
| 6,212,882 B1 | * | 4/2001 | Greger et al. ................ | 60/274 |

* cited by examiner

Primary Examiner—John Tweel
(74) Attorney, Agent, or Firm—Gudrun E. Huckett

(57) ABSTRACT

An outflow element for motor vehicles has a frame defining an outflow opening and at least one guide element mounted on the frame for guiding air exiting through the outflow opening. The at least one guide element has at least one illuminated display which displays differently as a function of the temperature of the air exiting through said outflow opening. The display is part of a light guide provided on the at least one guide element and is illuminated by light sources of different colors.

22 Claims, 3 Drawing Sheets

OUTFLOW ELEMENT FOR VEHICLES, IN PARTICULAR, MOTOR VEHICLES

BACKGROUND OF THE INVENTION

1. Field of the Invention

The invention relates to an outflow element for air in vehicles, in particular, motor vehicles, with at least one guide element for guiding the air flowing out of the outflow element.

2. Description of the Related Art

Such outflow elements are conventionally provided on the dashboard of vehicles. Depending on the interior temperature, hot or cold air flows through them into the interior of the vehicle. The temperature of the air entering the interior of the vehicle via the outflow element is either automatically controlled by air conditioning or manually by a switch.

SUMMARY OF THE INVENTION

It is an object of the present invention to develop an outflow element of the aforementioned kind such that the driver can obtain in a simple way information in regard to the temperature of the air flowing through the outflow element into the interior of the vehicle.

In accordance with the present invention, this is achieved in that the guide element is provided with at least one illuminated display which, as a function of the temperature of the outflowing air, displays differently.

In the outflow element according to the invention the guide element is provided with an illuminated display. Depending on the temperature of the air flowing out of the outflow element this display is illuminated differently. Accordingly, the driver obtains an optical signal which indicates to him whether cold or warm air flows into the interior of the vehicle.

DESCRIPTION OF THE PREFERRED EMBODIMENTS

Figure 1:
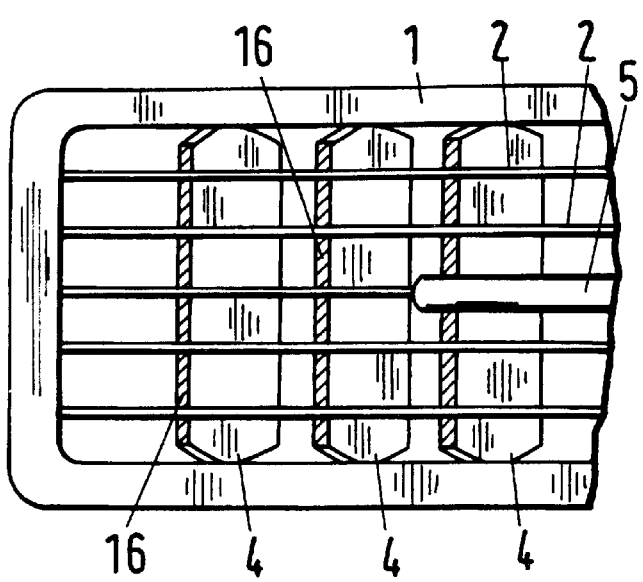
FIG. 1 is a plan view onto a portion of the outflow element according to the invention.

The outflow element according to the invention is conventionally arranged within the dashboard of the motor vehicle. Cold and hot air can flow through it into the interior of the vehicle. Such outflow elements can also be provided in the rear of the interior of the vehicle in order to supply cold or warm air to the rear seats of the vehicle. The outflow element comprises a frame 1 which is inserted into the matching mounting opening (not represented) as is known in the art. In the outflow opening 1a surrounded by the frame 1 stays 2 are positioned which are parallel to one another and spaced apart from one another at a distance. The frame 1 of the shown embodiment is rectangular. The stays 2 extend parallel to the longitudinal sides of the frame 1. The frame 1 can, of course, also have any other suitable outer contour.

Identical plate-shaped members or lamellas 4 are positioned behind the stays 2 and are pivotable about a vertical pivot axis 3. They can be pivoted simultaneously on their pivot axes 3 by means of an actuating element 5 in order to guide the air exiting from the outflow element into the desired direction. By means of the actuating element 5 all of the lamellas 4 can be pivoted simultaneously about their pivot axes 3 as is known in the art.

For pivotably supporting the lamellas 4 on the frame 1, the frame 1 is provided with securing parts 6, 7 (FIG. 2) which project past its backside and which are preferably a unitary part of the frame 1. The lamellas 4 are connected to these securing parts 6, 7.

Figure 3:
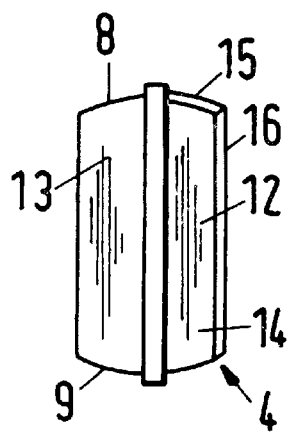
FIG. 3 is a side view of a lamella of the outflow element according to the invention.

The lamellas 4 have a substantially rectangular contour. The narrow sides 8, 9 have the shape of a pitched roof (FIG. 3). At half the length of the narrow sides 8, 9 an LED 10, 11 is provided, respectively. The LEDs 10, 11 have different colors. For example, at the upper narrow side 8 of the lamella 4 the LED 10 is red and the LED 11 at the lower narrow side 9 is blue. The LEDs 10, 11 of the lamellas 4 are connected to the current/voltage supply of the vehicle.

The part 12 of the lamella 4 facing the stays 2 is comprised of light guide material while the other part 13 is made of a suitable plastic material or the like which has no light guiding properties. The lateral surfaces 14, 15 of the lamella part 12 are covered such that no light can exit in this area. Only the end face 16 of the lamella part 12 is not covered so that the light emitted by the LEDs 10, 11 and passing through the light guide material can exit at this end face 16 to the exterior. This end face 16 of the lamella 4 is facing the outflow opening 1a. Accordingly, the driver of the vehicle can see the illuminated end face 16 functioning as a display through the grating formed by the stays 2.

The differently colored LEDs 10, 11 have the object to indicate to the driver of the vehicle whether cold, warm or hot air flows into the interior of the motor vehicle through the outflow element. The LEDs 10, 11 are switched on or triggered as a function of the temperature of the air flowing through the outflow element. When cold air flows through this outflow element, only the blue LEDs 11 of the lamellas 4 are supplied with current so that blue light exits at the end faces (displays) 16 of the lamellas 4. This indicates visually to the driver that cold air flows into the interior of the motor vehicle.

Once the air flowing through the outflow element is heated, as is usually the case when driving in the fall or winter, the red LEDs 10 are supplied with current so that the end faces 16 of the lamellas 4 will be illuminated in red.

For a medium temperature range it is possible to supply both LEDs 10, 11 of each lamella 4 with current so that at the end faces 16 of the lamellas show a correspondingly mixed color.

Figure 4:
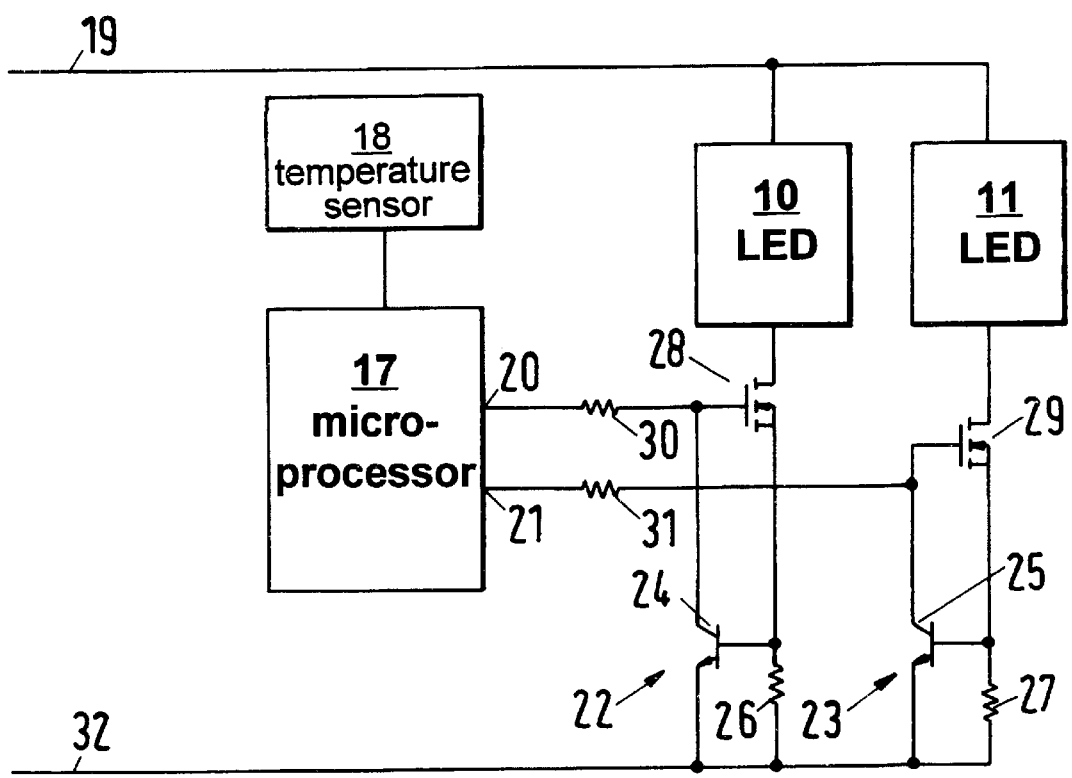
FIG. 4 is a circuit diagram for the outflow element according to the invention in a first embodiment.

FIG. 4 shows an example of a circuit diagram for controlling the LEDs 10, 11. A microprocessor 17 controls the brightness of the LEDs 10, 11 with a corresponding program as a function of the input signals of a temperature sensor 18 which measures the temperature of the air flowing through the outflow element. The microprocessor 17 is supplied with battery voltage 19. The signals emitted by the temperature sensor 18 are processed within the microprocessor 17 according to its program and are then supplied to the output terminals 20, 21 of the microprocessor. Current limiter stages 22, 23 are provided downstream of the microprocessor which limit the current supplied to the LEDs 10, 11, preferably to a constant current strength. The current limiter stages 22, 23 are identical and have each a transistor 24, 25 as well as a resistor 26, 27 connected in parallel. For controlling the LEDs 10, 11, a driver stage 28, 29 is provided, respectively. Each driver stage 28, 29 has at least one electronic switch, preferably a MOSFET (metal-oxide-silicon field effect transistor). Between the output terminals 20, 21 of the microprocessor 17 and the driver stages 28, 29 a resistor 30, 31 is respectively provided. The reference potential is provided by ground 32.

The temperature sensor 18 is positioned in the flow direction of the air upstream of the outflow element. It measures the respective temperature and provides a corresponding temperature signal to the microprocessor 17. The program stored therein is designed such that, below a predetermined air temperature, for example, below 21° C., a signal is provided only on the output terminal 21 which is supplied to the blue LEDs 11. The LEDs are accordingly supplied with current so that the end face (display) 16 of the lamellas 4 is illuminated in blue.

Above a predetermined temperature, for example, above 27° C., the program within the microprocessor 17 ensures that a signal is provided only at the terminal 20 so that accordingly only the red LEDs 10 are triggered. Accordingly, the end faces (displays) 16 of the lamellas 4 are illuminated in red. In the intermediate area of, for example, 21° C. and 27° C., the input signals of the temperature sensor 18 are evaluated by the program such that an output signal is provided on both output terminals 20, 21 of the microprocessor 17. Accordingly, the LEDs 10 and 11 are simultaneously supplied with current so that a mixed color results at the end face 16 of the lamellas 4.

Of course, it is possible to supply current only to the LEDs 10 or only to the LEDs 11 so that the end faces 16 of the lamellas 4 are illuminated either only red or only blue. Accordingly, the program in the microprocessor 17 processes the signals coming from the temperature sensor 18 such that below or above a predetermined temperature the signals are provided only at the output terminal 20 or only at the output terminal 21.

It is moreover possible to provide further LEDs for each lamella which, in deviation from blue and red, can be orange and yellow, for example. In this manner it is possible to supply current to the LEDs of different color in a more graduated fashion based on the temperature of the outflowing air so that the end faces 16 of the lamellas are illuminated correspondingly in the described different colors. The further LEDs are controlled in the same way as the LEDs 10, 11 by current limiter stages and driver stages. The microprocessor 17 has a corresponding number of output terminals. The program in the microprocessor is configured such that depending on the temperature the corresponding output terminals of the microprocessor 17 are controlled.

In principle, it is possible to form the lamellas 4 completely of light guiding material. In this case, however, each lamella 4 must be covered up to its end face 16 such that the light emitted by the LEDs and entering the lamellas 4 can exit only at the end face 16 of the lamella facing the stays 2, which end face 16 forms the display.

Figure 2:
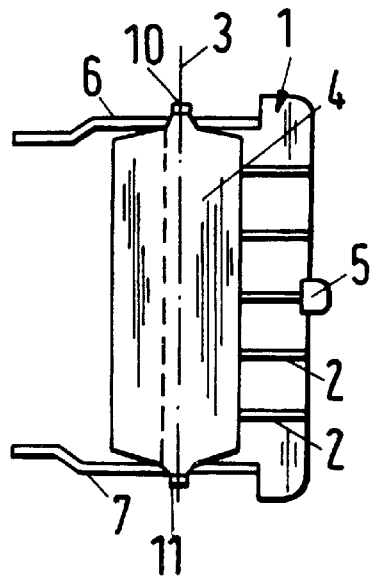
FIG. 2 is a side view of the outflow element according to the invention with a pivotable lamella.

The LEDs 10, 11, as can be seen in FIG. 2, are provided at the level of the pivot axis 3 of the lamellas 4. Accordingly, the LEDs when pivoting the lamellas 4 remain at the level of these pivot axes 3 so that the current supply is simplified.

Figure 5:
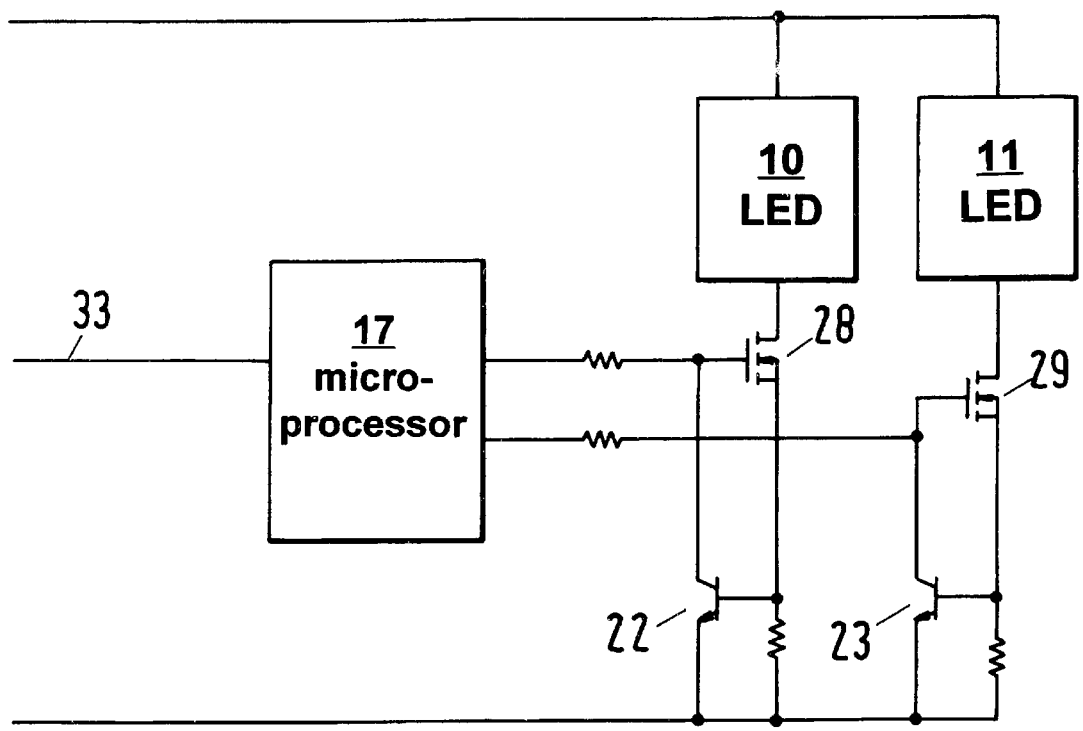
FIG. 5 is a circuit diagram for the outflow element according to the invention in a second embodiment.

In the circuit diagram example according to FIG. 5 the temperature signals are supplied by a CAN (controller area network) bus 33 to the microprocessor 17. The signals are processed by the program in the microprocessor 17 in the same way as described in connection with FIG. 4 so that, depending on the temperature of the outflowing air, the LEDs 10 and/or 11 are supplied with current via the current limiter stages 22, 23 and the driver stages 28, 29.

In the situations where the LEDs 10, 11 are simultaneously supplied with current as a result of a corresponding temperature of the outflowing air, the LEDs are supplied with current as a function of the respective temperature so as to cause different brightness. For example, with increasing heating of the supplied air the blue LEDs 11 will be provided with current to a lesser degree while the red LEDs 10 will be provided with a higher current until the blue LEDs 11 are no longer illuminated (turned off) at a predetermined temperature.

While specific embodiments of the invention have been shown and described in detail to illustrate the inventive principles, it will be understood that the invention may be embodied otherwise without departing from such principles.

What is claimed is:

1. An outflow element for motor vehicles, said outflow element comprising:
   a frame (1) defining an outflow opening (1a);
   at least one guide element (4) mounted on said frame (1) and configured to guide air exiting through said outflow opening (1a);
   wherein said at least one guide element (4) has at least one illuminated display (16) which displays differently as a function of a temperature of the air exiting through said outflow opening (1a).

2. The outflow element according to claim 1, wherein said at least one display (16) is configured to have a display brightness adjusted based on the temperature of the air exiting through said outflow opening (1a).

3. The outflow element according to claim 1, wherein said at least one display (16) is configured to have a display color adjusted based on the temperature of the air exiting through said outflow opening (1a).

4. The outflow element according to claim 3, wherein said at least one display (16) is configured to illuminate in at least one of at least two colors based on the temperature of the air exiting through said outflow opening (1a).

5. The outflow element according to claim 1, comprising a light guide (12), wherein said at least one display (16) is a part of said light guide (12).

6. The outflow element according to claim 5, wherein said at least one guide element (4) is at least partially formed by said light guide (12).

7. The outflow element according to claim 6, wherein said at least one guide element (4) is covered in the area of said light guide (12) with one area of said light guide (12) remaining uncovered and forming said at least one display (16).

8. The outflow element according to claim 1, wherein said at least one guide element (4) is plate-shaped or a lamella.

9. The outflow element according to claim 6, wherein said at least one display (16) is formed by an end face of said at least one guide element (4).

10. The outflow element according to claim 9, wherein said at least one display (16) is formed by an end face of said light guide (12).

11. The outflow element according to claim 1, comprising light sources (10, 11) for illuminating said at least one display (16), wherein said light sources are formed by LEDs or incandescent light bulbs.

12. The outflow element according to claim 11, wherein said light sources (10, 11) are colored differently.

13. The outflow element according to claim 1, wherein said at least one guide element (4) is supported on said frame (1) so as to be pivotable on a pivot axis (3).

14. The outflow element according to claim 13, further comprising light sources (10, 11) for illuminating said at least one display (16), wherein said light sources (10, 11) are formed by LEDs or incandescent light bulbs, wherein said light sources (10, 11) are mounted on said at least one guide element (4) at a level of said pivot axis (3).

15. The outflow element according to claim 1, wherein several of said guide elements (4) are provided and wherein each one of said guide elements (4) has at least one of said displays (16).

16. The outflow element according to claim 11, further comprising at least one temperature sensor (18) arranged in a flow path of the air exiting through said outflow opening (1a).

17. The outflow element according to claim 16, further comprising a microprocessor (17), wherein said at least one temperature sensor (18) is connected to said microprocessor (17).

18. The outflow element according to claim 17, further comprising light sources (10, 11) for illuminating said at least one display (16), wherein said light sources (10, 11) are formed by LEDs or incandescent light bulbs, and wherein said microprocessor (17) controls said light sources (10, 11).

19. The outflow element according to claim 18, wherein said microprocessor (17) is configured to continuously adjust a brightness of said light sources (10, 11) based on the temperature of the air exiting through said outflow opening (1a).

20. The outflow element according to claim 1, wherein said at least one guide element (4) has at least two light sources (10, 11) configured to illuminate said at least one display (16), wherein said at least two light sources (10, 11) are differently colored.

21. The outflow element according to claim 20, wherein said at least two light sources (10, 11) are configured to be switched on selectively based on the temperature of the air exiting through said outflow opening (1a).

22. The outflow element according to claim 20, wherein two of said light sources (10, 11) are provided and are configured to be controlled, based on the temperature of the air exiting through said outflow opening (1a), such that a brightness of a first one of said two light sources (10, 11) is reduced while a brightness of a second one of said two light sources (10, 11) is increased proportionately to the reduction of a brightness of said first light source (10, 11).

* * * * *